(12) United States Patent
Kim et al.

(10) Patent No.: US 12,483,280 B2
(45) Date of Patent: Nov. 25, 2025

(54) SWITCHING CIRCUIT FOR SWITCHING SIGNAL PATH IN WIRELESS COMMUNICATION SYSTEM, AND ELECTRONIC DEVICE COMPRISING SAME

(71) Applicant: Samsung Electronics Co., Ltd., Suwon-si (KR)

(72) Inventors: Jihoon Kim, Suwon-si (KR); Youngchang Yoon, Suwon-si (KR); Donghyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 125 days.

(21) Appl. No.: 18/165,006

(22) Filed: Feb. 6, 2023

(65) Prior Publication Data

US 2023/0188166 A1  Jun. 15, 2023

Related U.S. Application Data

(63) Continuation of application No. PCT/KR2021/010325, filed on Aug. 5, 2021.

(30) Foreign Application Priority Data

Aug. 6, 2020 (KR) .................. 10-2020-0098744

(51) Int. Cl.
*H04B 1/00* (2006.01)
*H04B 1/04* (2006.01)

(52) U.S. Cl.
CPC ......... *H04B 1/0078* (2013.01); *H04B 1/0483* (2013.01)

(58) Field of Classification Search
CPC ......... H03F 2200/451; H03F 2200/294; H03F 3/245; H03F 1/565; H03F 3/195;
(Continued)

(56) References Cited

U.S. PATENT DOCUMENTS 7,616,934 B2   11/2009   MacPhail
7,719,141 B2   5/2010    McMorrow
(Continued)

FOREIGN PATENT DOCUMENTS

CN   2004-092754 A   3/2004
CN     103957024 A   7/2014
(Continued)

OTHER PUBLICATIONS

European Search Report dated Dec. 15, 2023, issued in European Application No. 21853381.8.
(Continued)

*Primary Examiner* — Golam Sorowar
(74) *Attorney, Agent, or Firm* — Jefferson IP Law, LLP

(57) ABSTRACT

A 5th generation (5G) or pre-5G communication system for supporting a higher data rate than previous 4th generation (4G) communication systems is provided. A switching circuit in a wireless communication system is provided. The switching circuit includes a first coil, a second coil electrically coupled to the first coil, a first switch electrically connected to the second coil, a third coil electrically coupled to the first coil, a second switch electrically connected to the third coil, and a control unit configured to control the opening or closing of the first switch and the second switch. The control unit can be configured to close the first switch and open the second switch to form a first path using the first coil and the second coil, and open the first switch and close the second switch to form a second path using the first coil and the third coil.

20 Claims, 11 Drawing Sheets

(58) Field of Classification Search
CPC ......... H03F 2200/541; H03F 2200/387; H03F 3/24; H03F 3/193; H03F 2200/537; H03F 3/211; H03F 2200/165; H03F 2200/423; H03F 3/19; H03F 1/0222; H03F 1/0227; H03F 2200/102; H03F 2200/105; H04B 1/525; H04B 1/48; H04B 1/44; H04B 2001/0408; H04B 1/04; H04B 1/0458; H04B 1/18; H04B 1/123; H04B 5/26; H04B 5/72; H04B 5/79; H04B 1/0475; H04B 1/16; H04B 1/40; H04B 1/582; H04B 13/005; H04B 5/22; H04B 5/24; H04B 5/263; H04B 5/73; H04B 1/1036
See application file for complete search history.

(56) References Cited

U.S. PATENT DOCUMENTS

| | | | |
|---|---|---|---|
| 8,368,481 B2 | 2/2013 | Jin et al. | |
| 8,712,342 B2 | 4/2014 | Maimon et al. | |
| 9,219,518 B1 | 12/2015 | Chen et al. | |
| 10,199,195 B2 | 2/2019 | Borgwardt | |
| 10,637,528 B2 | 4/2020 | Liu | |
| 10,715,204 B2 | 7/2020 | Hur et al. | |
| 10,720,956 B2 | 7/2020 | Callender et al. | |
| 11,147,001 B2 | 10/2021 | Choi et al. | |
| 2007/0171997 A1 | 7/2007 | Weissman et al. | |
| 2010/0259319 A1 | 10/2010 | Chan et al. | |
| 2011/0279184 A1* | 11/2011 | Chan | H03F 1/347 330/277 |
| 2012/0157011 A1 | 6/2012 | Martineau | |
| 2013/0051532 A1 | 2/2013 | Caiafa | |
| 2013/0267185 A1 | 10/2013 | Chen et al. | |
| 2014/0011463 A1* | 1/2014 | Madan | H10D 86/01 327/434 |
| 2014/0139298 A1 | 5/2014 | Kim et al. | |
| 2014/0170999 A1* | 6/2014 | Aparin | H03F 3/68 455/132 |
| 2015/0249479 A1 | 9/2015 | Nobbe | |
| 2015/0333791 A1 | 11/2015 | Anderson et al. | |
| 2017/0019135 A1* | 1/2017 | Kwok | H04B 1/581 |
| 2017/0250728 A1 | 8/2017 | Afsahi et al. | |
| 2018/0097407 A1 | 4/2018 | Oshima et al. | |
| 2019/0326872 A1* | 10/2019 | Cheng | H01F 27/42 |
| 2020/0028536 A1* | 1/2020 | Liu | H04B 1/48 |
| 2020/0036345 A1* | 1/2020 | Snai | H04B 1/16 |
| 2020/0083924 A1 | 3/2020 | Callender et al. | |
| 2020/0099348 A1* | 3/2020 | Gebeyehu | H03F 1/565 |
| 2020/0106471 A1* | 4/2020 | Jang | H04B 1/44 |
| 2020/0106474 A1* | 4/2020 | Hur | H04B 1/006 |
| 2020/0403584 A1* | 12/2020 | Varonen | H03F 3/19 |
| 2021/0119596 A1* | 4/2021 | Yu | H03F 3/195 |
| 2024/0073305 A1* | 2/2024 | Yu | G06F 1/1643 |

FOREIGN PATENT DOCUMENTS

| | | |
|---|---|---|
| CN | 106469620 A | 3/2017 |
| CN | 110892754 A | 3/2020 |
| CN | 111181604 A | 5/2020 |
| JP | 2007-128985 A | 5/2007 |
| KR | 10-1045760 B1 | 7/2011 |
| KR | 10-2014-0064095 A | 5/2014 |
| KR | 10-1931682 B1 | 12/2018 |
| WO | 2017/008994 A1 | 1/2017 |

OTHER PUBLICATIONS

Korean Office Action dated Feb. 14, 2024, issued in Korean Application No. 10-2020-0098744.

Korean Notice of Patent Grant dated Feb. 19, 2025, issued in Korean Patent Application No. 10-2020-0098744.

Korean Office Action dated Oct. 25, 2024, issued in Korean Application No. 10-2020-0098744.

Chinese Office Action dated Sep. 19, 2025, issued in Chinese Application No. 202180065521.3.

* cited by examiner

SWITCHING CIRCUIT FOR SWITCHING SIGNAL PATH IN WIRELESS COMMUNICATION SYSTEM, AND ELECTRONIC DEVICE COMPRISING SAME

CROSS-REFERENCE TO RELATED APPLICATION(S)

This application is a continuation application, claiming priority under § 365 (c), of an International application No. PCT/KR2021/010325, filed on Aug. 5, 2021, which is based on and claims the benefit of a Korean patent application number 10-2020-0098744, filed on Aug. 6, 2020, in the Korean Intellectual Property Office, the disclosure of which is incorporated by reference herein in its entirety.

BACKGROUND

1. Field

The disclosure relates to a wireless communication system. More particularly, the disclosure relates to a switching circuit for switching signal paths in a wireless communication system, and an electronic device including the same.

2. Description of Related Art

To meet the demand for wireless data traffic having increased since deployment of fourth generation (4G) communication systems, efforts have been made to develop an improved fifth-generation (5G) or pre-5G communication system. Therefore, the 5G or pre-5G communication system is also called a "beyond 4G network" communication system or a "post long term evolution (LTE)" system.

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beamforming, large scale antenna techniques are discussed in 5G communication systems.

In addition, in 5G communication systems, development for system network improvement is under way based on advanced small cells, cloud radio access networks (cloud RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as advanced access technologies have also been developed.

In such a 5G system, performance improvement is required to minimize signal loss when transmitting or receiving data.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, aspect of the disclosure is to provide a switching circuit for reducing insertion loss in a reception path and a transmission path in a wireless communication system, and an electronic device including the same.

Another aspect of the disclosure is to provide a switching circuit capable of reducing insertion loss in a wireless communication system as matched impedance in a transmission path is higher than the impedance of an output terminal, and an electronic device including the same.

Another aspect of the disclosure is to provide a switching circuit capable of reducing insertion loss in a wireless communication system by enabling the use of a larger transistor, and an electronic device including the same.

Another aspect of the disclosure is to provide a switching circuit for improving noise figure (NF) in a reception path in a wireless communication system, and an electronic device including the same.

Another aspect of the disclosure is to provide a switching circuit which does not require an additional electrostatic discharge (ESD) circuit by providing an ESD function in a wireless communication system, and an electronic device including the same.

Additional aspects will be set forth in part in the description which follows and, in part, will be apparent from the description, or may be learned by practice of the presented embodiments.

In accordance with an aspect of the disclosure, a switching circuit in a wireless communication system is provided. The switching circuit includes a first coil, a second coil electrically coupled to the first coil, a first switch electrically connected to the second coil, a third coil electrically coupled to the first coil, a second switch electrically connected to the third coil, and a controller configured to control the opening or closing of the first switch and the second switch, wherein the controller is configured to close the first switch and open the second switch so as to establish a first path using the first coil and the second coil, and open the first switch and close the second switch so as to establish a second path using the first coil and the third coil.

In accordance with another aspect of the disclosure, an electronic device in a wireless communication system is provided. The electronic device includes at least on processor (or controller) and at least one communication unit including a plurality of switching circuits, wherein each of the plurality of switching circuits includes a first coil, a second coil electrically coupled to the first coil, a first switch electrically connected to the second coil, a third coil electrically coupled to the first coil, and a second switch electrically connected to the third coil, and the at least one processor is configured to close the first switch and open the second switch so as to establish a first path using the first coil and the second coil, and open the first switch and close the second switch so as to establish a second path using the first coil and the third coil.

A switching circuit and an electronic device including the same according to various embodiments of the disclosure enable insertion loss to be reduced by switching a transmission path and a reception path by using a plurality of coils.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to a switching circuit for switching signal paths in a wireless communication system and an electronic device including the same. Specifically, the disclosure describes a technique for establishing a transmission path and a reception path using coils and switching between the paths in a wireless communication system, thereby reducing insertion loss.

In the following description, terms referring to signals, referring to elements of a device or circuit, and the like are illustratively used for the sake of convenience. Therefore, the disclosure is not limited by the terms as used below, and other terms referring to subjects having equivalent technical meanings may be used.

In the disclosure, various embodiments will be described using terms employed in some communication standards (e.g., the 3rd generation partnership project (3GPP)), but they are only for the sake of illustration. The embodiments of the disclosure may also be easily applied to other communication systems through modifications.

Figure 1:
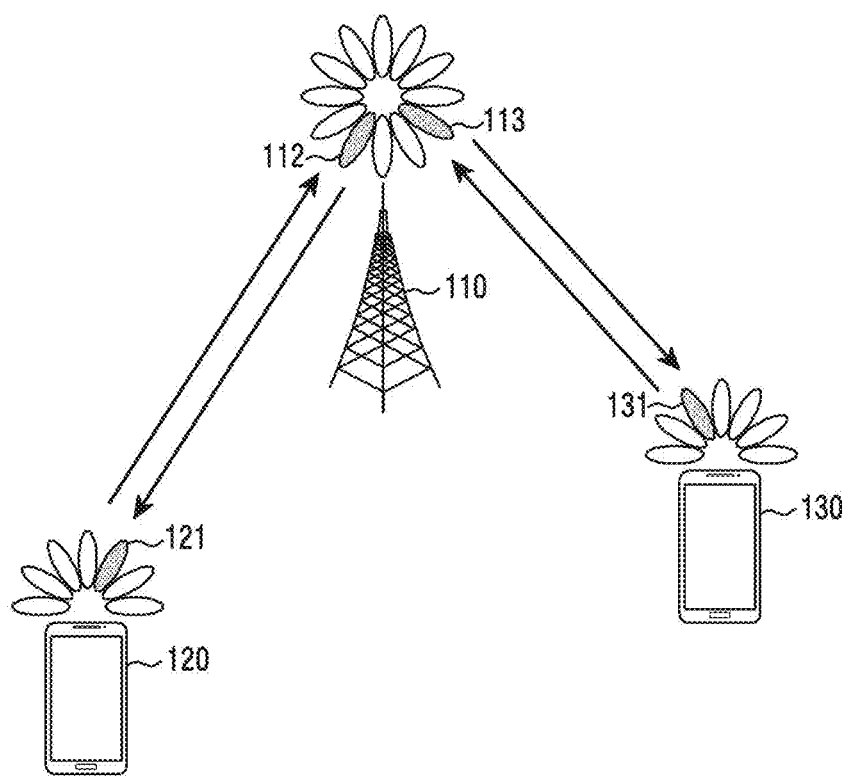
FIG. 1 illustrates a wireless communication system according to an embodiment of the disclosure.

FIG. 1 illustrates a wireless communication system according to an embodiment of the disclosure.

FIG. 1 illustrates a base station 110, a terminal 120, and a terminal 130 as a part of nodes using a wireless channel in a wireless communication system. FIG. 1 illustrates only one base station, but may further include another base station which is the same as or similar to the base station 110.

The base station 110 is a network infrastructure for providing a wireless connection to the terminals 120 and 130. The base station 110 has coverage defined as a predetermined geographical area based on a distance over which a signal may be transmitted. The base station 110 may be referred to as "an access point (AP)," "an evolved Node B (eNodeB) (eNB)," "a 5th generation (5G) node," "a wireless point," "a transmission/reception point (TRP)," or another term having an equivalent technical meaning, besides a base station.

Each of the terminal 120 and the terminal 130 is a device used by a user, and performs a communication with the base station 110 via a wireless channel. In some cases, at least one among the terminal 120 and the terminal 130 may be operated without a user's involvement. That is, at least one among the terminal 120 and the terminal 130 may be a device for performing machine type communication (MTC) and may not be carried by a user. Each of the terminal 120 and the terminal 130 may be referred to as "a user equipment (UE)," "a mobile station," "a subscriber station," "a remote terminal," "a wireless terminal," "a user device," or another term having an equivalent technical meaning, besides a terminal.

The base station 110, the terminal 120, and the terminal 130 may transmit and receive wireless signals in a mmWave band (e.g., 28 GHz, 30 GHZ, 38 GHZ, and 60 GHz). The base station 110, the terminal 120, and the terminal 130 may perform beamforming so as to improve channel gain. Beamforming may include transmission beamforming and reception beamforming. That is, the base station 110, the terminal 120, and the terminal 130 may assign directivity to a transmission signal or a reception signal. To this end, the base station 110 and the terminals 120 and 130 may select serving beams 112, 113, 121, and 131 via a beam search or a beam management procedure. After the serving beams 112, 113, 121, and 131 are selected, communication thereafter may be performed via a resource having a quasi co-located (QCL) relationship with a resource which has transmitted the serving beams 112, 113, 121, and 131.

If large-scale characteristics of a channel having transmitted a symbol on a first antenna port is capable of being inferred from a channel having transmitted a symbol on a second antenna port, the first antenna port and the second antenna port may be evaluated to be in a QCL relationship. For example, the large-scale characteristics may include at least one among delay spread, Doppler spread, Doppler shift, average gain, average delay, and spatial receiver parameter.

Figure 2:
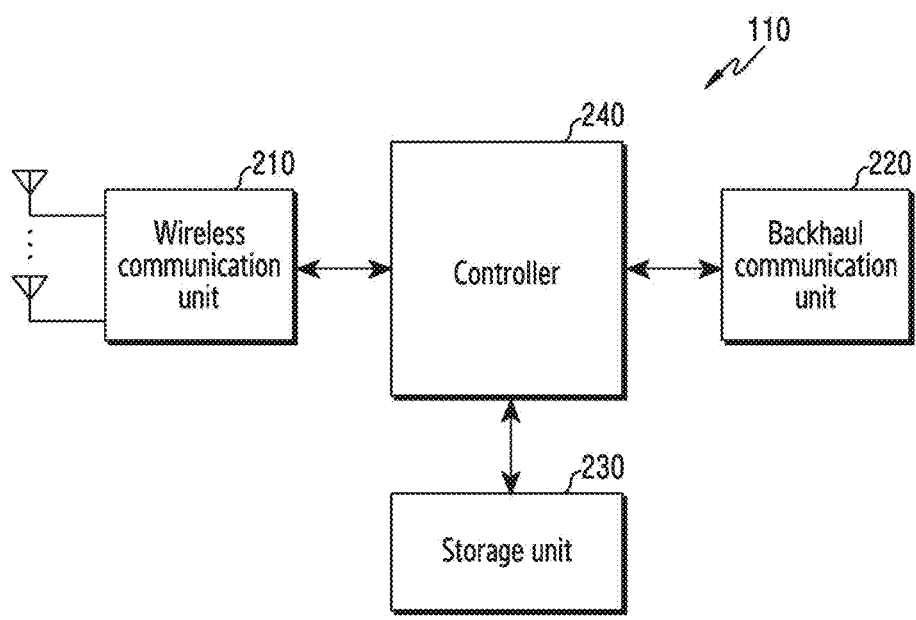
FIG. 2 illustrates a configuration of a base station in a wireless communication system according to an embodiment of the disclosure.

FIG. 2 illustrates a configuration of a base station in a wireless communication system according to an embodiment of the disclosure.

The configuration illustrated in FIG. 2 may be understood as a configuration of the base station 110. A term such as "... unit" and "... portion" used below may refer to a unit which processes at least one function or operation, and may be implemented as hardware, software, or a combination of hardware and software.

Referring to FIG. 2, a base station includes a wireless communication unit 210, a backhaul communication unit 220, a storage unit 230, and a controller 240.

The wireless communication unit 210 performs functions for transmitting and receiving signals via a wireless channel. For example, the wireless communication unit 210 performs a conversion function between a baseband signal and a bit string according to a physical layer standard of a system. For example, at the time of data transmission, the wireless communication unit 210 produces complex symbols by encoding and modulating a transmission bit string. In addition, at the time of data reception, the wireless communication unit 210 restores a reception bit string by demodulating and decoding a baseband signal.

The wireless communication unit 210 up-converts the baseband signal into a radio frequency (RF) band signal, then transmits the signal via an antenna, and down-converts the RF band signal received via the antenna into a baseband signal. To this end, the wireless communication unit 210 may include a transmission filter, a reception filter, an amplifier, a mixer, an oscillator, a digital to analog converter (DAC), an analog to digital converter (ADC), and the like. In addition, the wireless communication unit 210 may include a plurality of transmission/reception paths. Further, the wireless communication unit 210 may include at least one antenna array including a plurality of antenna elements.

In terms of hardware, the wireless communication unit 210 may include a digital unit and an analog unit, and the analog unit may include a plurality of sub-units according to operation power, operation frequency, and the like. The digital unit may be implemented with at least one processor or controller (e.g., a digital signal processor (DSP)).

The wireless communication unit 210 transmits and receives a signal as described above. Accordingly, a part or all of the wireless communication unit 210 may be referred to as "a transmitter," "a receiver," or "a transceiver." In addition, in the description below, transmission and reception performed via a wireless channel are used to mean that the above-described processing is performed by the wireless communication unit 210.

The backhaul communication unit 220 provides an interface for performing communication with other nodes in a network. That is, the backhaul communication unit 220 converts a bit string transmitted from a base station to another node, for example, another access node, another base station, an upper node, a core network, and the like into a physical signal, and converts a physical signal received from another node into a bit string.

The storage unit 230 stores data such as a basic program for operating a base station, an application program, and setting information. The storage unit 230 may include a volatile memory, a non-volatile memory, or a combination of volatile and non-volatile memories. The storage unit 230 provides the stored data according to the request of the controller 240.

The controller 240 controls overall operations of a base station. For example, the controller 240 transmits and receives a signal via the wireless communication unit 210 or the backhaul communication unit 220. In addition, the controller 240 records data in the storage unit 230 and read data therefrom. In addition, the controller 240 may perform functions of a protocol stack required by the communication standard. According to another implementation example, the protocol stack may be included in the wireless communication unit 210. To this end, the controller 240 may include at least one processor.

Figure 3:
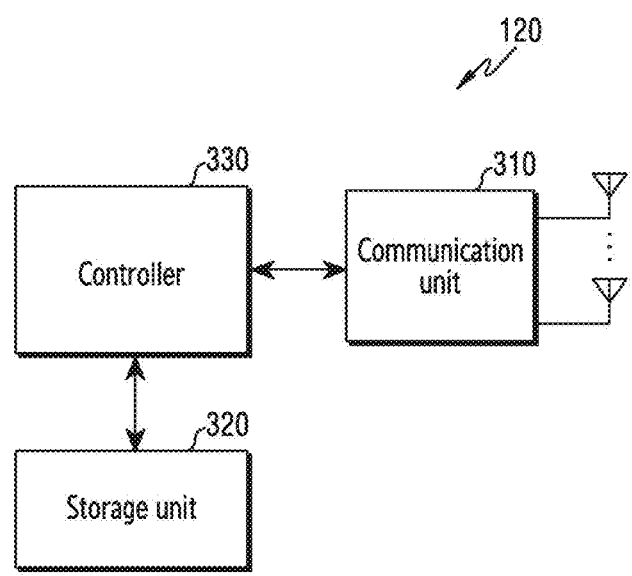
FIG. 3 illustrates a configuration of a terminal in a wireless communication system according to an embodiment of the disclosure.

FIG. 3 illustrates a configuration of a terminal in a wireless communication system according to an embodiment of the disclosure.

The configuration illustrated in FIG. 3 may be understood as a configuration of the terminal 120. A term such as "... unit" and "... portion" used below may refer to a unit which processes at least one function or operation, and may be implemented as hardware, software, or a combination of hardware and software.

Referring to FIG. 3, a terminal includes a communication unit 310, a storage unit 320, and a controller 330.

The communication unit 310 performs functions for transmitting and receiving a signal via a wireless channel. For example, the communication unit 310 performs a conversion function between a baseband signal and a bit string according to the physical layer standard of a system. For example, at the time of data transmission, the communication unit 310 produces complex symbols by encoding and modulating a transmission bit string. In addition, at the time of data reception, the communication unit 310 restores a reception bit string by demodulating and decoding a baseband signal. In addition, the communication unit 310 up-converts a baseband signal into an RF band signal, then transmits the signal via an antenna, and down-converts the RF band signal received via the antenna into a baseband signal. For example, the communication unit 310 may include a transmission filter, a reception filter, an amplifier, a mixer, an oscillator, a DAC, an ADC, and the like.

In addition, the communication unit 310 may include a plurality of transmission/reception paths. Further, the communication unit 310 may include at least one antenna array including a plurality of antenna elements. In terms of hardware, the communication unit 310 may include a digital circuit and an analog circuit (e.g., a radio frequency integrated circuit (RFIC)). The digital circuit and the analog circuit may be implemented in one package. In addition, the communication unit 310 may include a plurality of RF chains. Further, the communication unit 310 may perform beamforming.

In addition, the communication unit 310 may include different communication modules to process signals of different frequency bands. Further, the communication unit 310 may include a plurality of communication modules to support a plurality of different wireless access technologies. For example, the different wireless access technologies may include Bluetooth low energy (BLE), Wi-Fi, WiFi Gigabyte (WiGig), cellular networks such as Long Term Evolution (LTE), and the like. In addition, the different frequency bands may include a super high frequency (SHF) (e.g., 2.5 GHz and 5 GHz) band and a millimeter wave (e.g., 60 GHz) band.

The communication unit 310 transmits and receives a signal as described above. Accordingly, all or a part of the communication unit 310 may be referred to as "a transmission unit," "a reception unit," or "a transmission/reception unit." In addition, in the following description, transmission and reception performed via a wireless channel are used to mean that the above-described processing is performed by the communication unit 310.

The storage unit 320 stores data such as a basic program for operating a terminal, an application program, and configuration information. The storage unit 320 may include a volatile memory, a non-volatile memory, or a combination of volatile and non-volatile memories. In addition, the storage unit 320 provides the stored data according to the request of the controller 330.

The controller 330 controls overall operations of a terminal. For example, the controller 330 transmits and receives a signal through the communication unit 310. In addition, the controller 330 records data in the storage unit 320 and reads the data therefrom. The controller 330 may perform functions of a protocol stack required by the communication standard. To this end, the controller 330 may include at least one processor or a micro-processor, or may be a part of a processor. In addition, a part of the communication unit 310 and the controller 330 may be referred to as a communication processor (CP).

Figure 4:
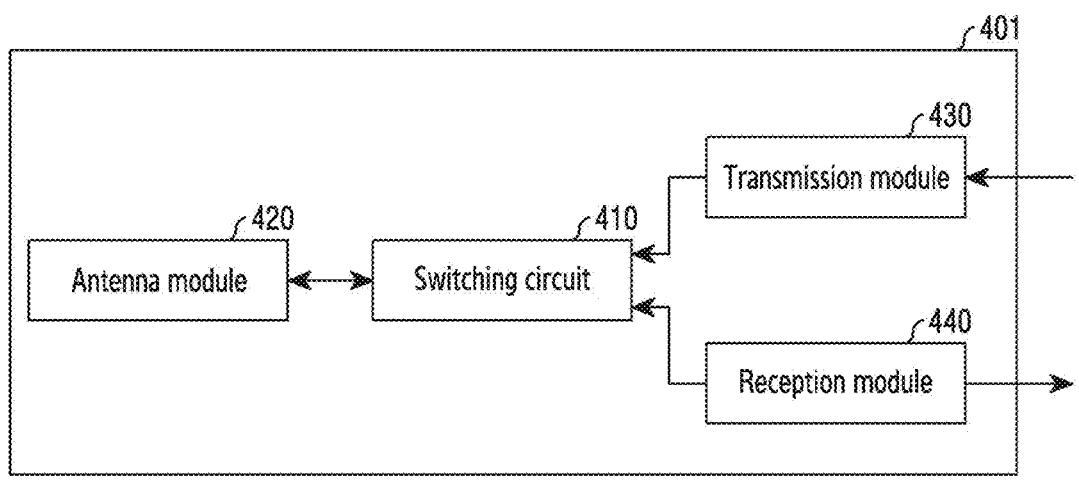
FIG. 4 illustrates a configuration of a communication unit according to an embodiment of the disclosure.

FIG. 4 illustrates a configuration of a communication unit 401 according to an embodiment of the disclosure.

FIG. 4 illustrates a detailed configuration of the wireless communication unit 210 of FIG. 2 or the communication unit 310 of FIG. 3. In an embodiment, the communication unit 401 of FIG. 4 may be included as a part of the wireless communication unit 210 of FIG. 2 or the communication unit 310 of FIG. 3.

Referring to FIG. 4, the communication unit 401 may include a switching circuit 410, an antenna module 420, a transmission module 430, a reception module 440, or a combination thereof. FIG. 4 shows that the communication unit 401 includes one switching circuit 410, one antenna module 420, one transmission module 430, and one reception module 440, but this is only an example. In an embodiment, the communication unit 401 may include a plurality of switching circuits and a plurality of antenna modules corresponding to the plurality of switching circuits, respectively. In an embodiment, in a case where the communication unit 401 includes a plurality of switching circuits, the communication unit 401 may include one transmission module 430 and one reception module 440 for all of the plurality of switching circuits. In an embodiment, in a case where the communication unit 401 includes a plurality of switching circuits, the communication unit 401 may include one transmission module 430 and one reception module 440 for each of the plurality of switching circuits.

In an embodiment, the switching circuit 410 may establish an electrical path between the transmission module 430 and the antenna module 420, or an electrical path between the reception module 440 and the antenna module 420. In an embodiment, the electrical path between the transmission module 430 and the antenna module 420 may be referred to as a transmission path. In an embodiment, the electrical path between the reception module 440 and the antenna module 420 may be referred to as a reception path.

In an embodiment, the switching circuit 410 and the antenna module 420 may be directly connected without passing via another component (e.g., a passive combiner) or may be indirectly connected via another component (e.g., a passive combiner).

In an embodiment, the switching circuit 410 may electrically disconnect the reception module 440 and the antenna module 420 while a transmission path is maintained. In an embodiment, the switching circuit 410 may electrically disconnect the transmission module 430 and the antenna module 420 while a reception path is maintained.

In an embodiment, the switching circuit 410 may switch path of a transmission path or a reception path, under the control of a controller (e.g., the controller 240 of FIG. 2 or the controller 330 of FIG. 3).

In an embodiment, the antenna module 420 may transmit and receive a signal via a wireless channel. In an embodiment, the antenna module 420 may radiate a signal transmitted from the transmission module 430 to a wireless channel. In an embodiment, the antenna module 420 may receive the signal of the wireless channel, and then transmit the received signal to the reception module 440.

In an embodiment, the transmission module 430 may up-convert an input signal (e.g., a baseband signal) into an RF band signal. In an embodiment, the transmission module 430 may convert an input signal into an analog signal. In an embodiment, the transmission module 430 may amplify the power of the input signal. To this end, the transmission module 430 may include a transmission filter, an amplifier, a mixer, an oscillator, a DAC, or a combination thereof. In an embodiment, an input signal may be a signal provided from a controller (e.g., the controller 240 of FIG. 2 or the controller 330 of FIG. 3).

In an embodiment, a signal produced by the transmission module 430 may be provided to the antenna module 420 via the switching circuit 410. In an embodiment, the signal produced by the transmission module 430 may be radiated to a wireless channel via the antenna module 420.

In an embodiment, the reception module 440 may down-convert an input signal (e.g., an RF band signal) into a baseband signal. In an embodiment, the reception module 440 may convert the input signal into a digital signal. In an embodiment, the reception module 440 may amplify the power of the input signal. To this end, the reception module 440 may include a reception filter, an amplifier (e.g., a low noise amplifier (LNA)), a mixer, an oscillator, an ADC, or a combination thereof.

In an embodiment, a signal produced by the reception module 440 may be provided to a controller (e.g., the controller 240 of FIG. 2 or the controller 330 of FIG. 3).

Figure 5A:
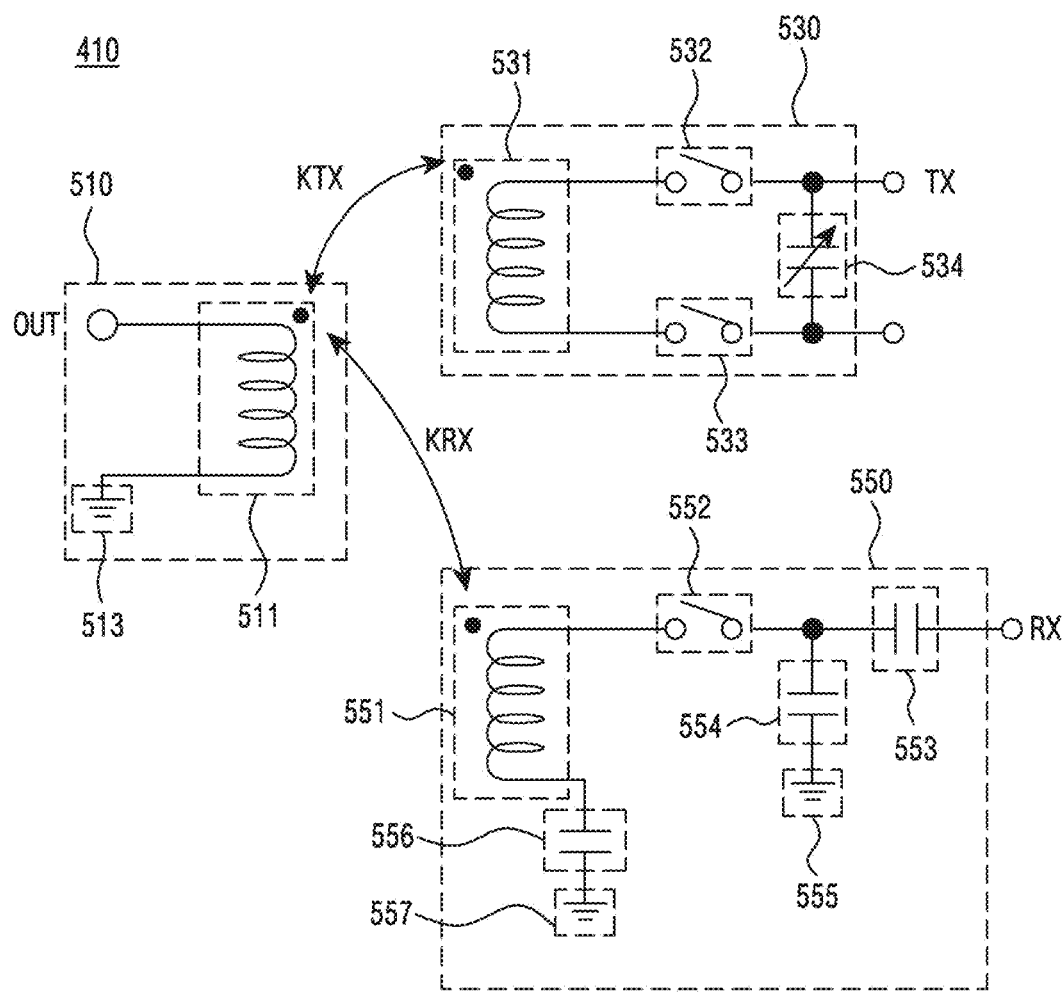
FIG. 5A illustrates a configuration of a switching circuit according to an embodiment of the disclosure.

FIG. 5A illustrates a configuration of a switching circuit 410 according to an embodiment of the disclosure.

Figure 5B:
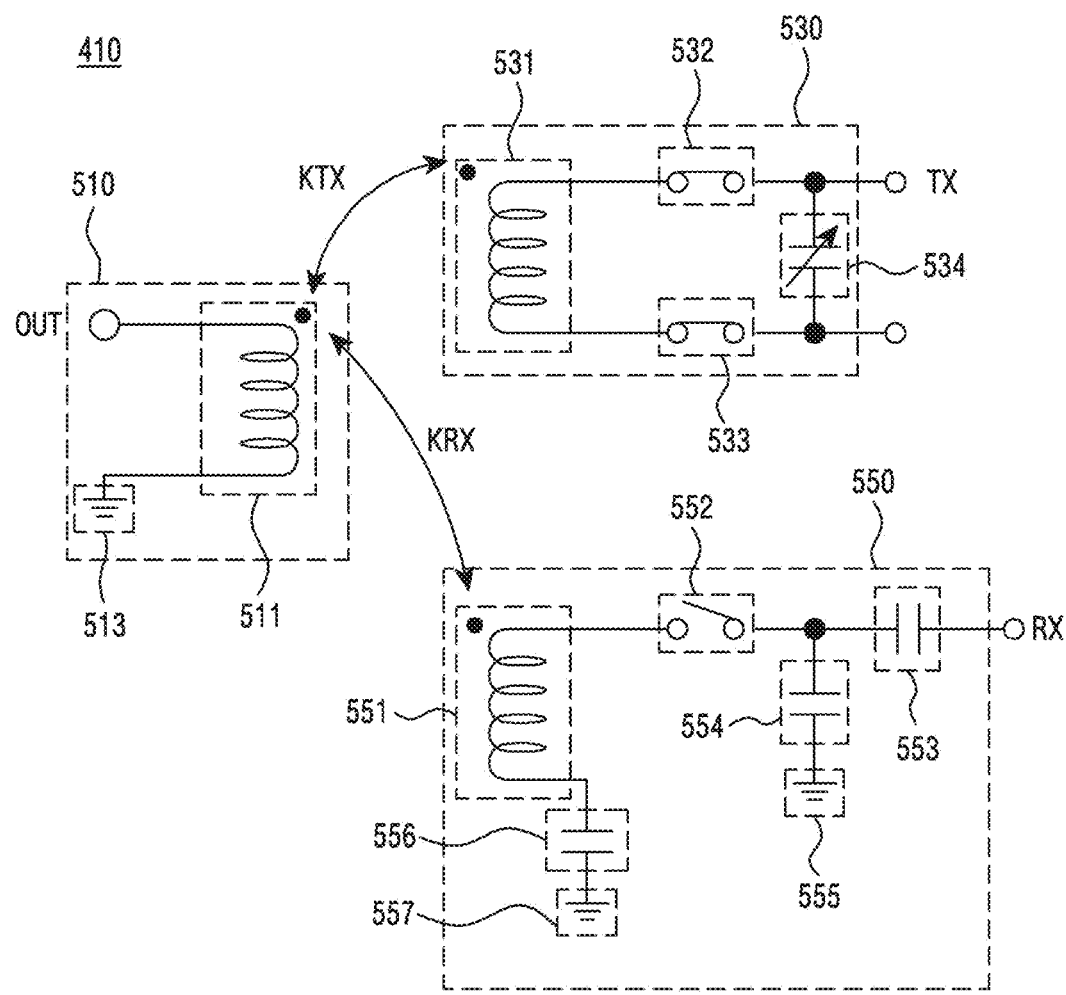
FIG. 5B is a view illustrating a transmission path established by a switching circuit according to an embodiment of the disclosure.

FIG. 5B is a view illustrating a transmission path established by a switching circuit 410 according to an embodiment of the disclosure.

Figure 5C:
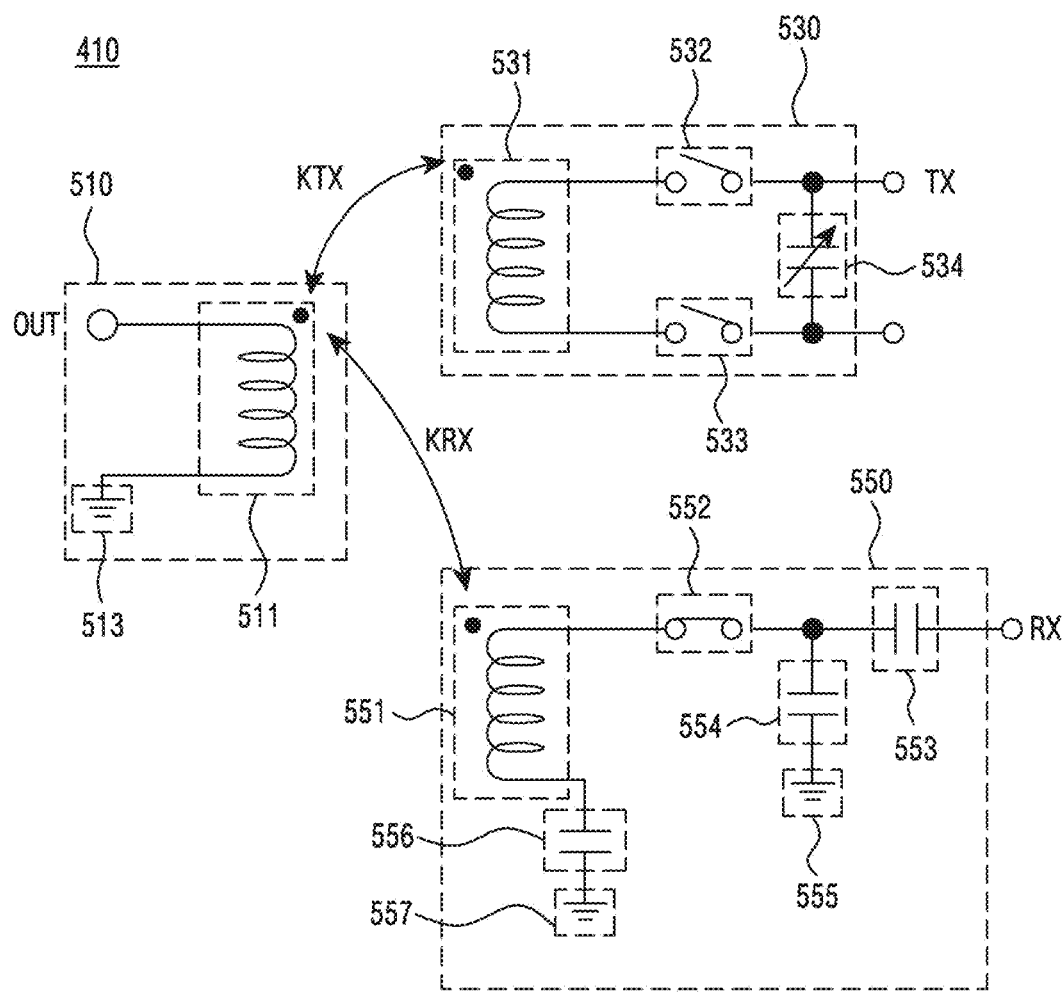
FIG. 5C is a view illustrating a reception path established by a switching circuit according to an embodiment of the disclosure.

FIG. 5C is a view illustrating a reception path established by a switching circuit 410 according to an embodiment of the disclosure.

Referring to FIG. 5A, a switching circuit 410 may include a primary winding part 510, a secondary winding part 530, and a tertiary winding part 550.

Referring to FIG. 5A, the primary winding part 510 and the secondary winding part 530 may be electrically connected to each other. In an embodiment, an electrical signal of the secondary winding part 530 may be transferred to the primary winding part 510. In an embodiment, an electrical signal of the secondary winding part 530 may be transferred to the primary winding part 510 by electromagnetic induction between the primary winding part 510 and the secondary winding part 530. In an embodiment, an electrical signal of the secondary winding part 530 may be transferred to the primary winding part 510 by mutual inductance between the primary winding part 510 and the secondary winding part 530. In an embodiment, the mutual inductance between the primary winding part 510 and the secondary winding part 530 may be determined based on a coupling coefficient (KTX) between the primary winding part 510 and the secondary winding part 530.

Referring to FIG. 5A, the primary winding part 510 and the tertiary winding part 550 may be electrically connected to each other. In an embodiment, an electrical signal of the primary winding part 510 may be transferred to the tertiary winding part 550. In an embodiment, an electrical signal of the primary winding part 510 may be transferred to the tertiary winding part 550 by electromagnetic induction between the primary winding part 510 and the tertiary winding part 550. In an embodiment, an electrical signal of the primary winding part 510 may be transferred to the tertiary winding part 550 by mutual inductance between the primary winding part 510 and the tertiary winding part 550. In an embodiment, the mutual inductance between the primary winding part 510 and the tertiary winding part 550 may be determined based on a coupling coefficient (KRX) between the primary winding part 510 and the tertiary winding part 550.

Referring to FIG. 5A, the primary winding part 510 may include a coil 511.

In an embodiment, one end of the coil 511 may be connected to the antenna module 420 of FIG. 4. In an embodiment, the other end of the coil 511 may be connected to a ground 513. In an embodiment, the other end of the coil 511 may be connected to the ground 513, and thus static electricity of the primary winding part 510 may be discharged via the ground 513.

Referring to FIG. 5A, the secondary winding part 530 may include a coil 531, switches 532 and 533, a capacitor 534, or a combination thereof.

Referring to FIG. 5A, one end of the coil 531 may be connected to a switch 532, and the other end of the coil 531 may be connected to a switch 533. In FIG. 5A, two switches are illustrated, but this is only an example. In an embodiment, at least one of the switches 532 and 533 may be omitted. In an embodiment, in a case where the switch 533 is omitted, one end of the coil 531 may be connected to the switch 532, and the other end of the coil 531 may be connected to the transmission module 430. In an embodiment, in a case where the switch 532 is omitted, the other end of the coil 531 may be connected to the transmission module 430, and the other end of the coil 531 may be connected to the switch 533.

Referring to FIG. 5A, the capacitor 534 may establish a parallel connection relationship with the coil 531 and the switches 532 and 533. In an embodiment, one end of the capacitor 534 may be connected to the switch 532 and the transmission module 430, and the other end of the capacitor 534 may be connected to the switch 533 and the transmission module 430.

Referring to FIG. 5A, the capacitor 534 may be a variable capacitor. In an embodiment, the electrical capacitance of the capacitor 534 may be changed by the controller (e.g., the controller 240 of FIG. 2 and the controller 330 of FIG. 3). In an embodiment, the electrical capacitance of the capacitor 534 may be changed by the controller (e.g., the controller 240 of FIG. 2 and the controller 330 of FIG. 3) so that the impedance of the transmission module 430 and the impedance of the load are matched with each other. In an embodiment, the impedance of the load may be the impedance of the secondary winding part 530, the primary winding part 510, the antenna module 420, or a combination thereof.

Referring to FIG. 5A, the tertiary winding part 550 may include a coil 551, a switch 552, capacitors 553, 554, and 556, or a combination thereof.

Referring to FIG. 5A, one end of the coil 551 may be connected to the switch 552, and the other end of the coil 531 may be connected to a capacitor 556. FIG. 5A shows that one end of the coil 551 is connected to the switch 552 and the other end of the coil 551 is connected to the capacitor 556, but this is only an example. In an embodiment, the switch 552 may be disposed between the coil 551 and the capacitor 556. In an embodiment, the switch 552 may be disposed between the capacitor 556 and a ground 557. In an embodiment, the capacitor 556 may remove a signal of the direct current component of the tertiary winding part 550. In an embodiment, by removing the signal of the direct current component of the tertiary winding part 550, the switch 552 may not be turned on (e.g., opened) by the signal of the direct current component of the tertiary winding part 550.

Referring to FIG. 5A, the capacitor 553 may be connected between the switch 552 and the reception module 440. Referring to FIG. 5A, one end of the capacitor 554 may be connected to the switch 552 and the capacitor 553, and the other end of the capacitor 554 may be connected to a ground 555. In an embodiment, the capacitors 553 and 554 may be used to improve a noise figure. In an embodiment, the capacitors 553 and 554 may have an electrical capacitance matched to an optimal noise figure of a low noise amplifier of the reception module 440.

Referring to FIG. 5B, while a transmission path is established, the switches 532 and 533 of the secondary winding part 530 may be closed, and the switch 552 of the tertiary winding part 550 may be opened.

In an embodiment, while a transmission path is established, a signal (e.g., an analog signal in an RF band) from the transmission module 430 may be provided to the primary winding part 510 through the coil 531 of the secondary winding part 530.

In an embodiment, while a transmission path is established, by removing the signal of the direct current component of the tertiary winding part 550 by the capacitor 556, the switch 552 may not be turned on (e.g., opened) by the signal of the direct current component of the tertiary winding part 550. In an embodiment, while a transmission path is established, the switch 552 may not be turned on by the capacitor 556, and thus the signal of the secondary winding part 530 may not be transferred to the tertiary winding part 550.

Referring to FIG. 5C, while a reception path is established, the switches 532 and 533 of the secondary winding part 530 are opened, and the switch 552 of the tertiary winding part 550 may be closed.

In an embodiment, while a reception path is established, a signal (e.g., an analog signal of an RF band) from the antenna module 420 may be provided to the tertiary winding part 550 through the coil 511 of the primary winding part 510. In an embodiment, while a reception path is established, a signal (e.g., an analog signal of an RF band) provided to the tertiary winding part 550 may be provided to the reception module 440.

In an embodiment, while a reception path is established, all the switches 532 and 533 may be opened, and thus the influence of the capacitor 534 of the secondary winding part 530 and/or the parasitic capacitor of the amplifier of the transmission module 430 on the tertiary winding part 550 may be reduced. In an embodiment, while a reception path is established, all the switches 532 and 533 are opened, and thus the influence of the capacitor 534 of the secondary winding part 530 and/or the parasitic capacitor of the amplifier of the transmission module 430 on the input impedance of the low noise amplifier of the tertiary winding part 550 may be reduced.

Figure 6:
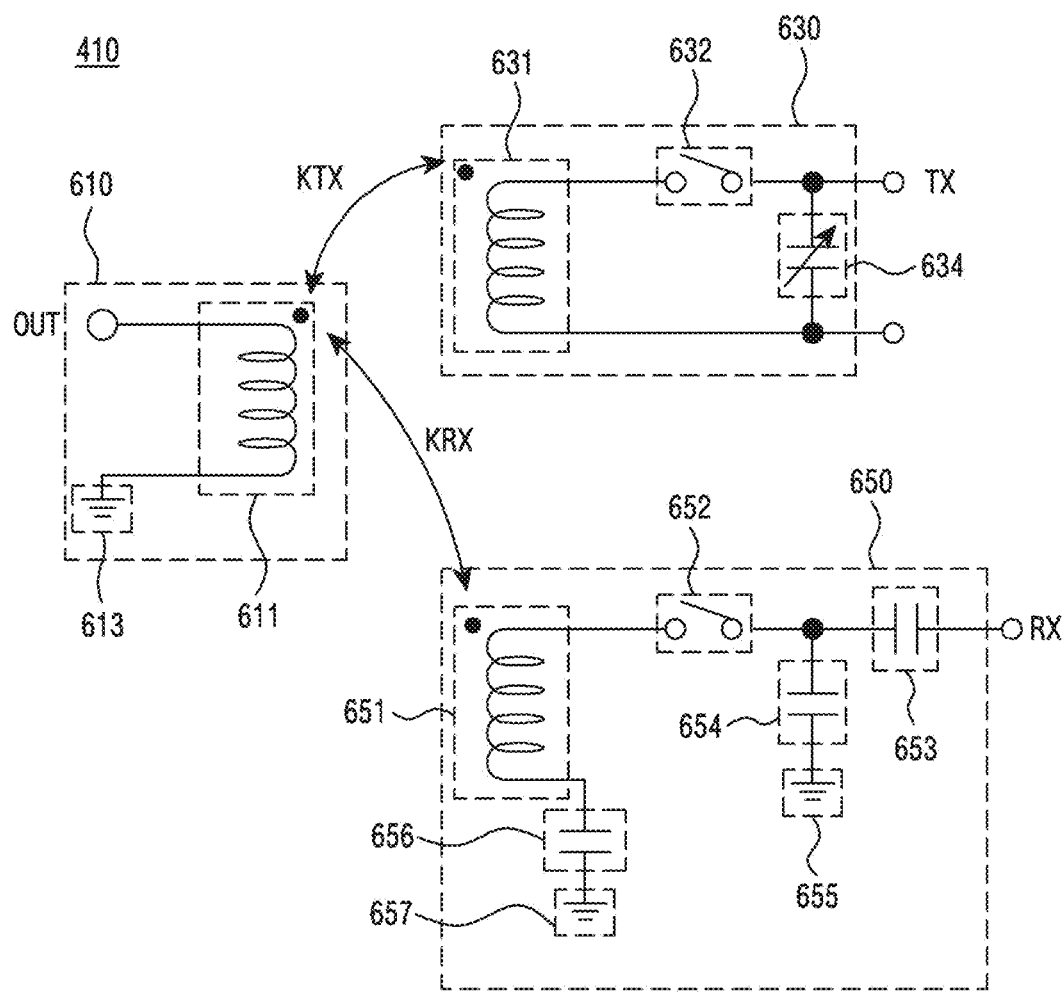
FIG. 6 illustrates a configuration of a switching circuit according to an embodiment of the disclosure.

FIG. 6 illustrates a configuration of a switching circuit 410 according to an embodiment of the disclosure.

Referring to FIG. 6, a switching circuit 410 may include a primary winding part 610, a secondary winding part 630, and a tertiary winding part 650.

Referring to FIG. 6, the primary winding part 610 and the secondary winding part 630 may be electrically connected to each other. In an embodiment, an electrical signal of the secondary winding part 630 may be transferred to the primary winding part 610. In an embodiment, an electrical signal of the secondary winding part 630 may be transferred to the primary winding part 610 by electromagnetic induction between the primary winding part 610 and the secondary winding part 630. In an embodiment, an electrical signal of the secondary winding part 630 may be transferred to the primary winding part 610 by mutual inductance between the primary winding part 610 and the secondary winding part 630. In an embodiment, the mutual inductance between the primary winding part 610 and the secondary winding part 630 may be determined based on a coupling coefficient (KTX) between the primary winding part 610 and the secondary winding part 630.

Referring to FIG. 6, the primary winding part 610 and the tertiary winding part 650 may be electrically connected to each other. In an embodiment, an electrical signal of the primary winding part 610 may be transferred to the tertiary winding part 650. In an embodiment, an electronic signal of the primary winding part 610 may be transferred to the tertiary winding part 650 by electromagnetic induction between the primary winding part 610 and the tertiary winding part 650. In an embodiment, an electrical signal of the primary winding part 610 may be transferred to the tertiary winding part 650 by mutual inductance between the primary winding part 610 and the tertiary winding part 650. In an embodiment, the mutual inductance between the primary winding part 610 and the tertiary winding part 650 may be determined based on a coupling coefficient (KRX) between the primary winding part 610 and the tertiary winding part 650.

Referring to FIG. 6, the primary winding part 610 may include a coil 611.

In an embodiment, one end of the coil 611 may be connected to the antenna module 420 of FIG. 4. In an embodiment, the other end of the coil 611 may be connected to a ground 613. In an embodiment, the other end of the coil 611 may be connected to the ground 613, and thus static electricity of the primary winding part 610 may be discharged via the ground 613.

Referring to FIG. 6, the secondary winding part 630 may include a coil 631, a switch 632, a capacitor 634, or a combination thereof.

Referring to FIG. 6, one end of the coil 631 may be connected to the switch 632, and the other end of the coil 631 may be connected to the transmission module 430.

Referring to FIG. 6, the capacitor 634 may establish a parallel connection relationship with the coil 631 and the switch 632. In an embodiment, one end of the capacitor 634 may be connected to the switch 632 and the transmission module 430, and the other end of the capacitor 634 may be connected to the transmission module 430.

Referring to FIG. 6, the capacitor 634 may be a variable capacitor. In an embodiment, an electrical capacitance of the capacitor 634 may be changed by a controller (e.g., the controller 240 of FIG. 2 and the controller 330 of FIG. 3). In an embodiment, the electrical capacitance of the capacitor 634 may be changed by the controller (e.g., the controller 240 of FIG. 2 and the controller 330 of FIG. 3) so that the impedance of the transmission module 430 and the impedance of the load are matched with each other. In an embodiment, the impedance of the load may be the impedance of the secondary winding part 630, the primary winding part 610, the antenna module 420, or a combination thereof.

Referring to FIG. 6, the tertiary winding part 650 may include a coil 651, a switch 652, capacitors 653, 654, and 656, or a combination thereof.

Referring to FIG. 6, one end of the coil 651 may be connected to the switch 652, and the other end of the coil 631 may be connected to the capacitor 656. FIG. 6 shows that one end of the coil 651 is connected to the switch 652 and the other end of the coil 651 is connected to the capacitor 656, but this is only an example. In an embodiment, the switch 652 may be disposed between the coil 651 and the capacitor 656. In an embodiment, the switch 652 may be disposed between the capacitor 656 and a ground 657. In an embodiment, the capacitor 656 may remove a signal of a direct current component of the tertiary winding part 650. In an embodiment, by removing the signal of the direct current component of the tertiary winding part 650, the switch 652 may not be turned on (e.g., opened) by the signal of the direct current component of the tertiary winding part 650.

Referring to FIG. 6, the capacitor 653 may be connected between the switch 652 and the reception module 440. Referring to FIG. 6, one end of the capacitor 654 may be connected to the switch 652 and the capacitor 653, and the other end of the capacitor 654 may be connected to a ground 655. In an embodiment, the capacitors 653 and 654 may be used to improve a noise figure. In an embodiment, the capacitors 653 and 654 may have an electrical capacitance matched to an optimal noise figure of the low noise amplifier of the reception module 440.

In an embodiment, while a transmission path is established in the switching circuit 410, the switch 632 of the secondary winding part 630 may be closed, and the switch 652 of the tertiary winding part 650 may be opened.

In an embodiment, while a transmission path is established, a signal (e.g., an analog signal of an RF band) from the transmission module 430 may be provided to the primary winding part 610 through the coil 631 of the secondary winding part 630.

In an embodiment, while a transmission path is established in the switching circuit 410, a signal of a direct current component of the tertiary winding part 650 may be removed by the capacitor 656, and thus the switch 652 may not be turned on (e.g., opened) by the signal of the direct current component of the tertiary winding part 650. In an embodiment, while a transmission path is established, the switch 652 may not be turned on by the capacitor 656, and thus the signal of the secondary winding part 630 may not be transferred to the tertiary winding part 650.

In an embodiment, while a reception path is established in the switching circuit 410, the switch 632 of the secondary winding part 630 may be opened, and the switch 652 of the tertiary winding part 650 may be closed.

In an embodiment, while a reception path is established in the switching circuit 410, a signal (e.g., an analog signal of an RF band) from the antenna module 420 may be provided to the tertiary winding part 650 through the coil 611 of the primary winding part 610. In an embodiment, while a reception path is established, the signal (e.g., an analog signal of an RF band) provided to the tertiary winding part 650 may be provided to the reception module 440.

In an embodiment, while a reception path is established in the switching circuit 410, the switch 632 may be opened, and thus the influence of the capacitor 634 of the secondary winding part 630 and/or the parasitic capacitor of the amplifier of the transmission module 430 on the tertiary winding part 650 may be reduced. In an embodiment, while a reception path is established, the switch 632 may be opened, and thus the influence of the capacitor 634 of the secondary winding part 630 and/or the parasitic capacitor of the amplifier of the transmission module 430 on the input impedance of the low noise amplifier of the tertiary winding part 650 may be reduced.

Figure 7:
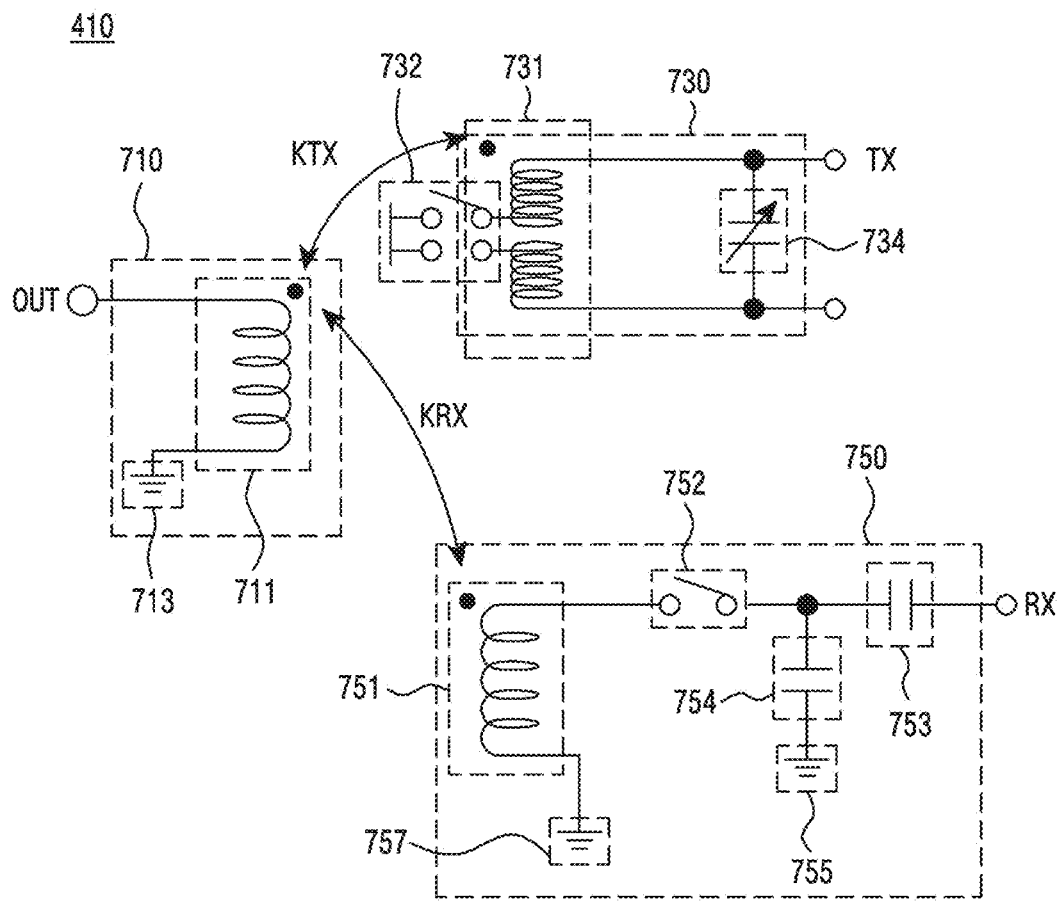
FIG. 7 illustrates a configuration of a switching circuit according to an embodiment of the disclosure.

FIG. 7 illustrates a configuration of a switching circuit 410 according to an embodiment of the disclosure.

Referring to FIG. 7, a switching circuit 410 may include a primary winding part 710, a secondary winding part 730, and a tertiary winding part 750.

The switching circuit 410 of FIG. 7 may have a configuration in which the capacitor 656 is omitted, compared with the switching circuit 410 of FIG. 6. The switching circuit 410 of FIG. 7 may have a configuration in which the position of a switch 732 is adjusted, compared with the switching circuit 410 of FIG. 6.

Referring to FIG. 7, the switch 732 of the secondary winding part 730 may be disposed in the middle of a coil 731. Referring to FIG. 7, the switch 732 may be disposed in the middle of the coil 731 so as to connect a part of the coil 731 and the rest of the coil 731 in series.

Referring to FIG. 7, the primary winding part 710 may include a coil 711. In an embodiment, one end of the coil 711 may be connected to the antenna module 420 of FIG. 4. In an embodiment, the other end of the coil 711 may be connected to a ground 713.

Referring to FIG. 7, the secondary winding part 730 may include a coil 731, a switch 732, a capacitor 734, or a combination thereof.

Referring to FIG. 7, one end and the other end of the coil 731 may be connected to the transmission module 430.

Referring to FIG. 7, the capacitor 734 may establish a parallel connection relationship with the coil 731 and the switch 732. In an embodiment, one end and the other end of the capacitor 734 may be connected to the coil 731 and the transmission module 430.

Referring to FIG. 7, the tertiary winding part 750 may include a coil 751, a switch 752, capacitors 753 and 754, or a combination thereof. FIG. 7 shows that one end of the coil 751 is connected to the switch 752 and the other end of the coil 751 is connected to a ground 757. Referring to FIG. 7, the capacitor 753 may be connected between the switch 752 and the reception module 440. Referring to FIG. 7, one end of the capacitor 754 may be connected to the switch 752 and the capacitor 753, and the other end of the capacitor 754 may be connected to a ground 755. In an embodiment, the capacitors 753 and 754 may be used to improve a noise figure. In an embodiment, the capacitors 753 and 754 may have an electrical capacitance matched to an optimal noise figure of the low noise amplifier of the reception module 440.

In an embodiment, while a transmission path is established in the switching circuit 410, the switch 732 of the secondary winding part 730 may be closed, and the switch 752 of the tertiary winding part 750 may be opened.

In an embodiment, while a reception path is established in the switching circuit 410, the switch 732 of the secondary winding part 730 may be opened, and the switch 752 of the tertiary winding part 750 may be closed.

Figure 8:
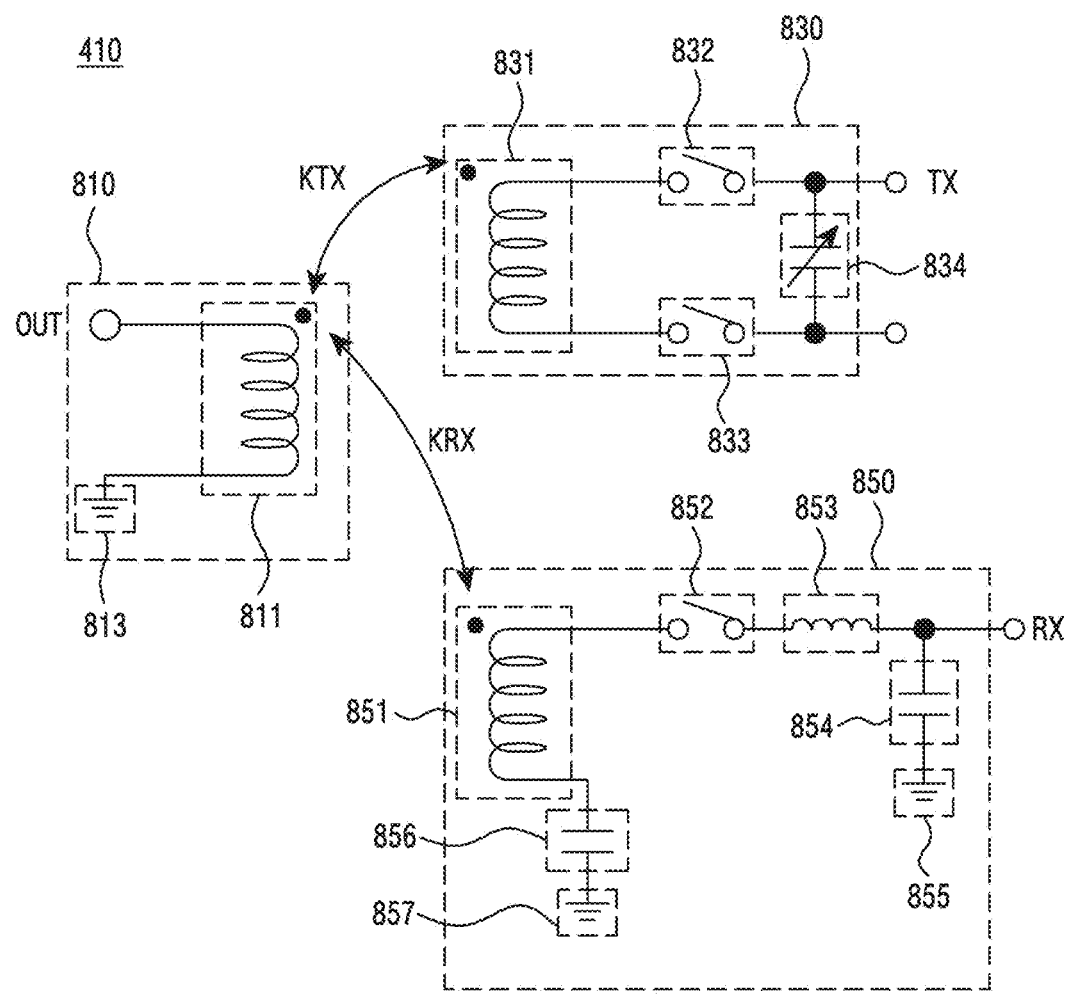
FIG. 8 illustrates a configuration of a switching circuit according to an embodiment of the disclosure.

FIG. 8 illustrates a configuration of a switching circuit 410 according to an embodiment of the disclosure.

Referring to FIG. 8, a switching circuit 410 may include a primary winding part 810, a secondary winding part 830, and a tertiary winding part 850.

In the switching circuit 410 of FIG. 8, the configuration of the tertiary winding part 850 may be changed, compared with the switching circuit 410 of FIG. 5A. The switching circuit 410 of FIG. 8 may have a configuration in which the capacitors 553 and 554 have changed to a filter, compared with the switching circuit 410 of FIG. 5A.

Referring to FIG. 8, the filter may be a low pass filter including an inductor 853 and a capacitor 854. However, this is only an example, the filter may include a low pass filter, a high pass filter, a band pass filter, or a combination thereof, according to electrical characteristics required by the switching circuit 410.

Referring to FIG. 8, the primary winding part 810 may include a coil 811.

Referring to FIG. 8, the secondary winding part 830 may include a coil 831, switches 832 and 833, a capacitor 834, or a combination thereof.

Referring to FIG. 8, the tertiary winding part 850 may include a coil 851, a switch 852, a filter (e.g., an inductor 853 and a capacitor 854), a capacitor 856, or a combination thereof.

Referring to FIG. 8, reference numerals 813, 857, and 855 may refer to a ground.

In an embodiment, while a transmission path is established in the switching circuit 410, the switches 832 and 833 of the secondary winding part 830 may be closed, and the switch 852 of the tertiary winding part 850 may be opened.

In an embodiment, while a reception path is established in the switching circuit 410, the switches 832 and 833 of the secondary winding part 830 may be opened, and the switch 852 of the tertiary winding part 850 may be closed.

The embodiments illustrated with reference to FIGS. 5A to 5C and 6 to 8 may be combined without departing from the scope of the disclosure. In an embodiment, a primary winding part of any switching circuit may be based on one primary winding part among the primary winding part 510 of FIG. 5A, the primary winding part 610 of FIG. 6, the primary winding part 710 of FIG. 7, or the primary winding part 810 of FIG. 8. In an embodiment, a secondary winding part of any switching circuit may be based on one secondary winding part among the secondary winding part 530 of FIG. 5A, the secondary winding part 630 of FIG. 6, the secondary winding part 730 of FIG. 7, or the secondary winding part 830 of FIG. 8. In an embodiment, a tertiary winding part of any switching circuit may be based on one tertiary winding part among the tertiary winding part 550 of FIG. 5A, the tertiary winding part 650 of FIG. 6, the tertiary winding part 750 of FIG. 7, or the tertiary winding part 850 of FIG. 8. For example, any switching circuit may be based on the primary winding part 510 in FIG. 5A, the secondary winding part 730 in FIG. 7, and the tertiary winding part 850 in FIG. 8. As another example, any switching circuit may be based on the primary winding part 610 of FIG. 6, the secondary winding part 630 of FIG. 6, and the tertiary winding part 750 of FIG. 7.

Figure 9:
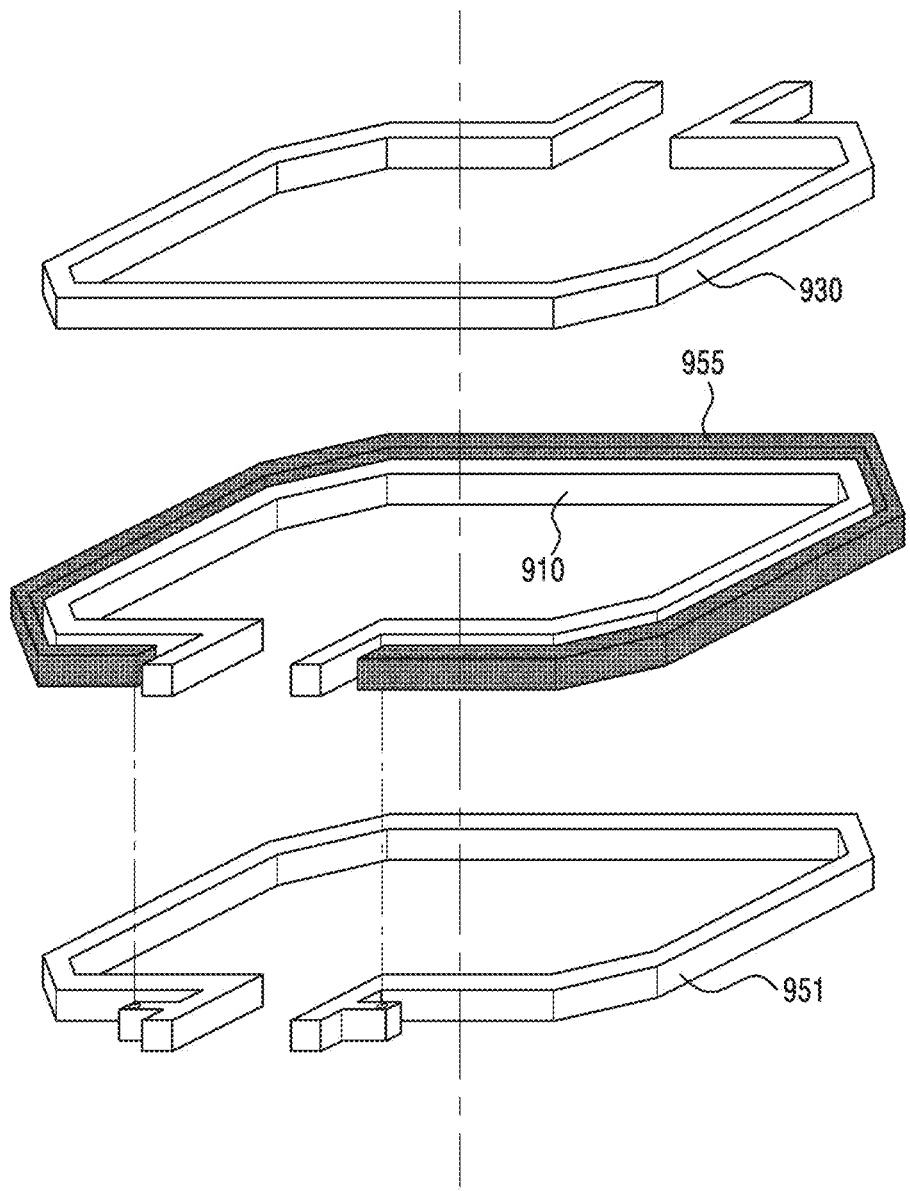
FIG. 9 illustrates a lamination structure of coils according to an embodiment of the disclosure.

FIG. 9 illustrates a lamination structure of coils 910, 930, 951, and 955 according to an embodiment of the disclosure.

In an embodiment, a coil 910 of FIG. 9 may correspond to the coil of the primary winding part of the switching circuit 410. In an embodiment, a coil 930 of FIG. 9 may correspond to the coil of the secondary winding part of the switching circuit 410. In an embodiment, coils 951 and 955 of FIG. 9 may correspond to the coil of the tertiary winding part of the switching circuit 410. According to an embodiment, the coil 910 may be used as the coil of the secondary winding part or the coil of the tertiary winding part. According to an embodiment, the coil 930 may be used as the coil of the primary winding part or the coil of the tertiary winding part. According to an embodiment, the coils 951 and 955 may be used as the coil of the primary winding part or the coil of the secondary winding part.

In an embodiment, an electrical signal of the coil 930 may be transferred to the coil 910 by mutual inductance between the coil 910 and the coil 930. In an embodiment, the mutual inductance between the coil 910 and the coil 930 may be determined based on the coupling coefficient (KTX) between the coil 910 and the coil 930.

In an embodiment, an electrical signal of the coil 910 may be transferred to the coils 951 and 955 by mutual inductance between the coil 910 and the coils 951 and 955. In an embodiment, the mutual inductance between the coil 910 and the coils 951 and 955 may be determined based on the coupling coefficient (KRX) between the coil 910 and the coils 951 and 955.

Referring to FIG. 9, the coils 910, 930, 951, and 955 may be disposed on the same layer or different layers. Referring to FIG. 9, the coils 910 and 955 may be disposed on the same layer. Referring to FIG. 9, the coils 910, 930, and 951 may be disposed on different layers. In an embodiment, the layer on which the coil 930 is disposed may be an uppermost layer (an aluminum-pad (AP) layer). In an embodiment, the layer on which the coils 910 and 955 are disposed may be a layer (e.g., an M8 layer) following the uppermost layer (an AP layer). In an embodiment, the layer on which the coil 951 is disposed may be a layer (e.g., an M7 layer) following the layer on which the coils 910 and 955 are disposed.

Referring to FIG. 9, the coils 951 and 955 disposed on different layers may be electrically connected to each other. In an embodiment, the coils 951 and 955 disposed on different layers may be electrically connected to each other, and thus may configure one coil.

Unlike the embodiment illustrated in FIG. 9, one of the coils 951 and 955 disposed on different layers may be omitted so as to correspond to the inductance of the coil required by the switching circuit 410. Unlike the embodiment illustrated in FIG. 9, a coil electrically connected to the coil 910 to configure one coil may be included in another layer (e.g., an AP layer or an M7 layer) so as to correspond to the inductance of the coil required by the switching circuit 410. Unlike the embodiment illustrated in FIG. 9, a coil electrically connected to the coil 930 to configure one coil may be disposed on another layer (e.g., an M8 layer or an M7 layer) so as to correspond to the inductance of the coil required by the switching circuit 410. Unlike the embodiment illustrated in FIG. 9, a coil electrically connected to at least one coil among the coils 910, 930, 951, and 955 to configure one coil may be disposed on any layer (e.g., an M6 layer or layers below the M6 layer).

In an embodiment, the coil 910 may be electrically connected to the antenna module 420. In an embodiment, the coil 930 may be electrically connected to the transmission module 430. In an embodiment, the coils 951 and 955 may be electrically connected to the reception module 440.

A switching circuit according to an embodiment of the disclosure as described above may include a first coil, a second coil electrically coupled to the first coil, a first switch electrically connected to the second coil, a third coil electrically coupled to the first coil, a second switch electrically connected to the third coil, and a controller configured to control opening or closing of the first switch and the second switch, wherein the controller is configured to close the first switch and open the second switch so as to establish a first path using the first coil and the second coil, and open the first switch and close the second switch so as to establish a second path using the first coil and the third coil.

In a switching circuit according to an embodiment of the disclosure, one end of the first coil may be connected to an antenna module so as to transmit a signal to a wireless channel or receive a signal from the wireless channel, and the other end of the first coil may be grounded.

A switching circuit according to an embodiment of the disclosure may further include a variable capacitor, and the variable capacitor is connected in parallel to the second coil and the first switch.

A switching circuit according to an embodiment of the disclosure may further include a third switch, and one end of the second coil is electrically connected to the first switch, the other end of the second coil is electrically connected to the third switch, and the controller is configured to close the third switch so as to establish the first path, and open the third switch so as to establish the second path.

A switching circuit according to an embodiment of the disclosure may further include a first capacitor and a second capacitor, wherein the first capacitor is a series capacitor for the second switch, and the first capacitor is a shunt capacitor for the second switch.

A switching circuit according to an embodiment of the disclosure may further include a third capacitor, wherein one end of the third capacitor is electrically connected to the third coil and the other end of the third capacitor is grounded.

A switching circuit according to an embodiment of the disclosure may further include a filter for filtering a designated frequency, wherein the coil is connected, via the filter, to a reception module configured to process a signal acquired via the second path.

In a switching circuit according to an embodiment of the disclosure, the filter may be a low pass filter.

In a switching circuit according to an embodiment of the disclosure, the first coil, the second coil and the third coil may be configured by being stacked.

In a switching circuit according to an embodiment of the disclosure, the first coil may be configured by being stacked between the second coil and the third coil.

An electronic device according to an embodiment of the disclosure as described above may include at least one processor and at least one communication unit including a plurality of switching circuits, wherein each of the plurality of switching circuits includes a first coil, a second coil electrically coupled to the first coil, a first switch electrically connected to the second coil, a third coil electrically coupled to the first coil, and a second switch electrically connected to the third coil, and the at least one processor is configured to close the first switch and open the second switch so as to establish a first path using the first coil and the second coil, and open the first switch and close the second switch so as to establish a second path using the first coil and the third coil.

An electronic device according to an embodiment of the disclosure may further include an antenna module for transmitting a signal to a wireless channel or receiving a signal from the wireless channel, wherein one end of the first coil is connected to the antenna module and the other end of the first coil is grounded.

An electronic device according to an embodiment of the disclosure may further include a variable capacitor, wherein the variable capacitor is connected to the second coil and the first switch in parallel.

An electronic device according to an embodiment of the disclosure may further include a third switch, wherein one end of the second coil is electrically connected to the first switch, the other end of the second coil is electrically connected to the third switch, and the at least one processor is configured to close the third switch so as to establish the first path, and open the third switch so as to establish the second path.

An electronic device according to an embodiment of the disclosure may further include a first capacitor and a second capacitor, wherein the first capacitor is a series capacitor for the second switch, and the first capacitor is a shunt capacitor for the second switch.

An electronic device according to an embodiment of the disclosure may further include a third capacitor, wherein one end of the third capacitor is electrically connected to the third coil and the other end of the third capacitor is grounded.

An electronic device according to an embodiment of the disclosure may further include a reception module configured to process a signal acquired via the second path and a filter for filtering a designated frequency, wherein the coil is connected to the reception module via the filter.

In an electronic device according to an embodiment of the disclosure, the filter may be a low pass filter.

In an electronic device according to an embodiment of the disclosure, the first coil, the second coil, and the third coil may be configured by being stacked.

In an electronic device according to an embodiment of the disclosure, the first coil may be configured by being stacked between the second coil and the third coil.

It should be appreciated that various embodiments of the disclosure and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first," "a second," "the first," and "the second" may be used to simply distinguish a corresponding element from another, and does not limit the elements in other aspect (e.g., importance or order). It is to be understood that if an element (e.g., a first element) is referred to, with or without the term "operatively" or "communicatively," as "coupled with/to" or "connected with/to" another element (e.g., a second element), it means that the element may be coupled/connected with/to the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit." The "module" may be a minimum unit of a single integrated component adapted to perform one or more functions, or a part thereof. For example, according to an embodiment, the "module" may be implemented in the form of an application-specific integrated circuit (ASIC).

An embodiment as set forth herein may be implemented as software (e.g., the program 140) including one or more instructions that are stored in a storage medium (e.g., an internal memory or external memory) that is readable by a machine (e.g., the electronic device 120). For example, a processor (e.g., the processor 330) of the machine (e.g., the electronic device 120) may invoke at least one of the one or more stored instructions from the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to an embodiment, each element (e.g., a module or a program) of the above-described elements may include a single entity or multiple entities. According to an embodiment, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A switching circuit comprising:
a first coil;
a second coil electrically coupled to the first coil;
a first switch electrically connected to the second coil;
a third coil electrically coupled to the first coil;
a second switch electrically connected to the third coil; and a controller configured to control opening or closing of the first switch and the second switch,
wherein the controller is configured to:
in order to establish a transmission path using the first coil and the second coil, close the first switch and open the second switch, and
in order to establish a reception path using the first coil and the third coil, open the first switch and close the second switch,
wherein, in case that the transmission path is established, a first signal is delivered from the second coil to the first coil based on a first mutual inductance, and
wherein, in case that the reception path is established, a second signal is delivered from the first coil to the third coil based on a second mutual inductance.

2. The switching circuit of claim 1,
wherein one end of the first coil is connected to an antenna module so as to transmit a signal to a wireless channel or receive the second signal from the wireless channel, and
wherein the other end of the first coil is grounded.

3. The switching circuit of claim 1, further comprising:
a variable capacitor,
wherein the variable capacitor is connected to the second coil and the first switch in parallel.

4. The switching circuit of claim 1, further comprising:
a third switch,
wherein one end of the second coil is electrically connected to the first switch,
wherein the other end of the second coil is electrically connected to the third switch, and
wherein the controller is configured to:
in order to establish the transmission path, close the third switch, and
in order to establish the reception path, open the third switch.

5. The switching circuit of claim 1, further comprising:
a first capacitor and a second capacitor,
wherein the first capacitor is a series capacitor for the second switch, and
wherein the second capacitor is a shunt capacitor for the second switch.

6. The switching circuit of claim 1, further comprising:
a third capacitor,
wherein one end of the third capacitor is electrically connected to the third coil, and
wherein the other end of the third capacitor is grounded.

7. The switching circuit of claim 1, further comprising:
a filter configured to filter a designated frequency,
wherein the third coil is connected, via the filter, to a reception module configured to process the second signal acquired via the reception path.

8. The switching circuit of claim 7, wherein the filter is a low pass filter.

9. The switching circuit of claim 1, wherein the first coil, the second coil, and the third coil are configured by being stacked.

10. The switching circuit of claim 9, wherein the first coil is configured by being stacked between the second coil and the third coil.

11. An electronic device comprising:
at least one processor; and
at least one communication unit comprising a plurality of switching circuits,
wherein each of the plurality of switching circuits comprises:
a first coil,
a second coil electrically coupled to the first coil,
a first switch electrically connected to the second coil,
a third coil electrically coupled to the first coil, and
a second switch electrically connected to the third coil, and
wherein the at least one processor is configured to:
in order to establish a transmission path using the first coil and the second coil, close the first switch and open the second switch, and
in order to establish a reception path using the first coil and the third coil, open the first switch and close the second switch,
wherein, in case that the transmission path is established, a first signal is delivered from the second coil to the first coil based on a first mutual inductance, and
wherein, in case that the reception path is established, a second signal is delivered from the first coil to the third coil based on a second mutual inductance.

12. The electronic device of claim 11, further comprising:
an antenna module configured to transmit the first signal to a wireless channel or receive the second signal from the wireless channel,
wherein one end of the first coil is connected to the antenna module, and
wherein the other end of the first coil is grounded.

13. The electronic device of claim 12, wherein the other end of the first coil discharges a static electric charge to ground.

14. The electronic device of claim 11, further comprising:
a variable capacitor,
wherein the variable capacitor is connected in parallel to the second coil and the first switch.

15. The electronic device of claim 11, further comprising:
a third switch,
wherein one end of the second coil is electrically connected to the first switch,
wherein the other end of the second coil is electrically connected to the third switch, and
wherein the at least one processor is further configured to:
in order to establish the transmission path, close the third switch, and
in order to establish the reception path, open the third switch.

16. The electronic device of claim 11, further comprising:
a first capacitor and a second capacitor,
wherein the first capacitor is a series capacitor for the second switch, and
wherein the second capacitor is a shunt capacitor for the second switch.

17. The electronic device of claim 11,
wherein an electrical signal of the second coil is transferred to the first coil by mutual inductance between the first coil and the second coil, and
wherein the mutual inductance between the first coil and the second coil is determined based on a coupling coefficient (KTX) between the first coil and the second coil.

18. The electronic device of claim 11,
wherein an electrical signal of the first coil is transferred to the third coil by mutual inductance between the first coil and the third coil, and
wherein the mutual inductance between the first coil and the third coil is determined based on a coupling coefficient (KRX) between the first coil and the third coil.

19. The electronic device of claim 11, wherein the first switch is disposed in a middle of the second coil.

20. The electronic device of claim 19, wherein first switch is configured to connect a first part of the second coil and a second part of the second coil in series, when closed.

* * * * *